US012049833B1

(12) United States Patent
Raghuvaran et al.

(10) Patent No.: US 12,049,833 B1
(45) Date of Patent: Jul. 30, 2024

(54) ROTOR DISKS WITH DISK POST INSERTS AND METHODS OF ASSEMBLING THE SAME

(71) Applicant: General Electric Company, Schenectady, NY (US)

(72) Inventors: Vaishnav Raghuvaran, Bangalore (IN); Bhaskar Nanda Mondal, Bangalore (IN); Gary W. Bryant, Loveland, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 18/202,503

(22) Filed: May 26, 2023

(51) Int. Cl.
*F01D 5/30* (2006.01)

(52) U.S. Cl.
CPC ............ *F01D 5/30* (2013.01); *F05D 2220/32* (2013.01); *F05D 2230/60* (2013.01); *F05D 2240/30* (2013.01)

(58) Field of Classification Search
CPC ... F01D 5/02; F01D 5/025; F01D 5/30; F01D 5/3023; F01D 5/303; F01D 5/3038
See application file for complete search history.

(56) References Cited

U.S. PATENT DOCUMENTS

| | | | | |
|---|---|---|---|---|
| 1,687,891 | A | 10/1928 | Ray | |
| 1,705,585 | A | 3/1929 | Ray | |
| 2,157,827 | A | 5/1939 | Erich | |
| 2,931,625 | A | 4/1960 | Harold et al. | |
| 6,241,832 | B1 * | 6/2001 | Miller | C21D 8/00 72/62 |
| 6,991,433 | B2 | 1/2006 | Mons | |
| 9,051,845 | B2 * | 6/2015 | Bommanakatte | F01D 5/3053 |
| 10,066,494 | B2 | 9/2018 | Kim et al. | |
| 10,358,930 | B2 | 7/2019 | Ju et al. | |
| 10,539,022 | B2 | 1/2020 | Choi | |
| 10,544,691 | B2 * | 1/2020 | Houck | B25B 27/04 |
| 10,890,081 | B2 * | 1/2021 | Freeman | F01D 5/282 |
| 11,313,325 | B2 * | 4/2022 | Dievart | F01D 21/04 |
| 2012/0263596 | A1 * | 10/2012 | Evans | F01D 5/30 416/193 A |
| 2016/0305260 | A1 * | 10/2016 | Freeman | F01D 5/284 |

FOREIGN PATENT DOCUMENTS

| | | | | |
|---|---|---|---|---|
| EP | 3708778 A1 | | 9/2020 | |
| JP | 2002195102 A | * | 7/2002 | F01D 11/008 |

* cited by examiner

*Primary Examiner* — Courtney D Heinle
*Assistant Examiner* — Danielle M. Christensen
(74) *Attorney, Agent, or Firm* — Dinsmore & Shohl LLP

(57) ABSTRACT

A rotor disk for a gas turbine engine includes disk posts extending in a radial direction from a disk body. Each of the disk posts includes an insert receiving slot extending axially through the disk post and a disk post pressure surface. Disk post inserts are assembled within the insert receiving slots of each of the disk posts. A blade is retained by disk post pressure surfaces of each of the disk posts.

19 Claims, 4 Drawing Sheets

ROTOR DISKS WITH DISK POST INSERTS AND METHODS OF ASSEMBLING THE SAME

TECHNICAL FIELD

The present specification generally relates to engines, fan assemblies for engines, methods of assembling the same, and, more particularly, to such engines, rotor disks.

BACKGROUND

Many engines include a fan assembly operably coupled to a turbine assembly that is operably connected to a compressor assembly. The fan, turbine and compressor assemblies may include a rotor disk and an array of blades that extend radially outward from the rotor disk. During engine operation, the rotor disk may be rotated such that the blades rotate about a central axis. This rotation imparts a centrifugal force on the blades which is transferred to the rotor disk. As a result, rotor disks are often made from strong materials configured to withstand the stresses imposed by the centrifugal force of the blades. These materials can be expensive and heavy and, as such, it is desirable to provide other fan assembly configurations that can withstand the stresses imposed by the centrifugal forces.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

DETAILED DESCRIPTION

Figure 1:
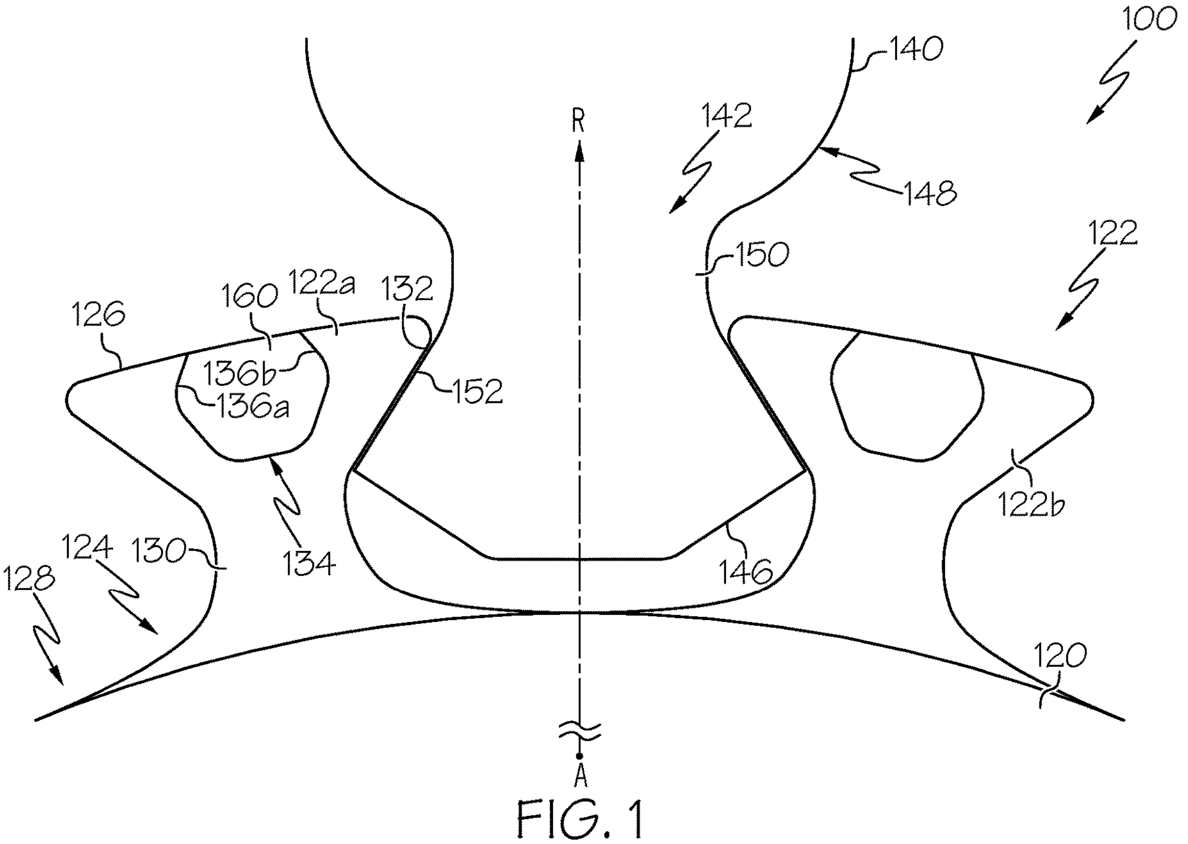
FIG. 1 schematically depicts a partial cross section of a fan assembly taken normal to the axial direction, according to one or more embodiments shown and described herein.

Reference will now be made in detail to various embodiments of devices, assemblies, and methods, examples of which are illustrated in the accompanying drawings. Whenever possible, the same reference numerals will be used throughout the drawings to refer to the same or like parts. FIG. 1 schematically depicts a fan assembly that includes a fan disk. The fan disk may include disk posts extending in a radial direction from the fan disk. Each disk post may include an insert receiving slot extending axially through the disk post and a disk post pressure surface. The fan assembly may include disk post inserts assembled within the insert receiving slots of each disk post. The fan assembly may include a fan blade retained by the disk post pressure surfaces of said each disk post. Because the disk posts and the disk post inserts are formed separately and then assembled together, the disk posts and the disk post inserts may be formed of different materials. In some embodiments, this separate formation of the disk posts and disk post inserts may allow the disk post inserts to be made from a material that is less dense and/or less expensive than the material of the disk post.

It should be noted that while a fan rotor disk (i.e., fan disk) is described below, the disk posts with insert receiving slots and disk post inserts may be used with rotor disks of compressor assemblies and turbine assemblies of gas turbine engines. The term "blade" is intended to broadly include any radial aerofoil mounted in any of the fan assembly, turbine assembly and compressor assembly including a fan blade, turbine blade and compressor blade and connectable to a rotor disk.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms “a,” “an,” and “the” include plural referents unless the context clearly dictates otherwise. Thus, for example, reference to “a” component includes aspects having two or more such components, unless the context clearly indicates otherwise.

Referring to FIG. 1, an embodiment of a fan assembly 100 is schematically depicted. In embodiments, the fan assembly 100 may be included within an engine and operably coupled to and rotated by a turbine assembly (not depicted). Accordingly, during engine operation, the fan assembly 100 may rotated about an axial direction A, which is the axis of rotation of the engine. The fan assembly 100 may include a fan disk 120 that which may retain a fan blade 140. The fan disk 120 may include blade retaining means formed as a plurality of disk posts, both represented by element 122, such as a first disk post 122*a* and a second disk post 122*b*. The disk posts 122 may be evenly spaced about rotational support means formed as a disk body, both represented by element 128, of the fan disk 120.

Each disk post 122 may extend radially outward from disk body 128 of the fan disk 120 (e.g. in a radial direction R) such that the disk posts 122 each define an attachment region 124 at the disk body 128 of the fan disk 120 and an outer surface 126 disposed radially outward of the attachment region 124. Disposed radially inward of the outer surface 126 may be a disk post neck 130. As depicted, the disk post neck 130 may be narrower than the attachment region 124 and the outer surface 126. As will be described in greater detail herein, the disk post neck 130 may be narrowed to allow the fan blade 140 to be assembled between the disk post neck 130 of the first disk post 122*a* and the disk post neck 130 of the second disk post 122*b*. Each disk post 122 may define disk post pressure surfaces 132 disposed at a non-parallel angle to the radial direction R. The disk post pressure surfaces 132 may be disposed between the disk post neck 130 and outer surface 126, such as depicted. As will be described in greater detail herein, the disk post pressure surfaces 132 may be angled relative to the axial direction to retain the fan blade 140 therein.

Still referring to FIG. 1, each disk post 122 may define an insert receiving means formed as an insert receiving slot, both represented by element 134, extending axially therethrough (e.g. through each disk post 122 in the axial direction A). The insert receiving slot 134 may extend wholly or partially through the disk post 122 in the axial direction. In embodiments, the insert receiving slot 134 may extend radially inward from outer surface 126 such that it forms a concave hollow region extending radially inward from the outer surface 126 of the disk post 122. In embodiments, the insert receiving slot 134 may be disposed radially outward of the disk post neck 130. In such embodiments, the insert receiving slot 134 may have a cross sectional shape that narrows as the insert receiving slot 134 extends radially toward the disk post neck 130. In embodiments, the insert receiving slot 134 may define a substantially polygonal shape (i.e., generally polygonal with the rounded corners illustrated in FIG. 1). However, as will be described in greater detail herein, other shapes are contemplated and possible. For example, the insert receiving slot 134 may be any angular, rounded, regular, or irregular shape. The insert receiving slot 134 may include one or more retention surfaces 136 such as the retention surfaces 136*a* and 136*b*. The one or more retention surfaces 136 may be oriented at a non-parallel angle to the radial direction R. Accordingly, as will be described in greater detail herein, the one or more retention surfaces 136*a* and 136*b* may retain a disk post insert 160 within the insert receiving slot 134 when the disk post insert 160 is acted upon by a centrifugal force in the radial direction R during engine operation.

Still referring to FIG. 1, the fan assembly 100 may include a fan blade 140. The fan blade 140 may include a dovetail region 142 extending radially inward from a blade portion 148 the fan blade 140. The dovetail region 142 may define an inner surface 146 disposed on a radially inner side of the dovetail region 142. Disposed radially outward of inner surface 146 may be a fan blade neck 150. As depicted, the fan blade neck 150 may be narrower than the dovetail region 148 and the inner surface 146. The dovetail region 142 may define fan blade pressure surfaces 152 disposed at a non-parallel angle to the radial direction R. In particular, the fan blade pressure surfaces 152 may be oriented at the same angle relative to the radial direction R as the disk post pressure surfaces 132. The fan blade pressure surfaces 152 may be disposed between the fan blade neck 150 and the inner surface 146, such as depicted. As will be described in greater detail herein, during engine operation, the fan blade pressure surfaces 152 may be flush against or contiguous with the disk post pressure surfaces 132 in order to retain the fan blades 140 during operation.

Still referring to FIG. 1, the fan assembly 100 may include a disk insert 160. The disk insert 160 may have a complementary shape to the insert receiving slot 134. Specifically, the disk insert 160 may have substantially the same cross sectional shape as the insert receiving slot 134 extending in the axial direction A, such as depicted in FIG. 1. In embodiments, the disk insert 160 may extend for substantially the same axial distance (e.g. in the axial direction A) as the insert receiving slot 134. Accordingly, the disk insert 160 may fill or substantially fill a total volume of the insert receiving slot 134 when assembled within the insert receiving slot 134.

In light of FIG. 1, the fan blade 140 may be assembled between the first disk post 122*a* and the second disk post 122*b*. In particular, the disk post neck 130 may be sufficiently narrow to allow the inner surface 146 of the fan blade 140 to fit between the disk post neck 130 of the first disk post 122*a* and the disk post neck 130 of the second disk post 122*b*. In a similar manner, the fan blade neck 150 may be sufficiently narrow to fit between the outer surface 126 of the first disk post 122*a* and the outer surface 126 of the second disk post 122*b*. Accordingly, the fan blade 140 may be assembled into the fan disk 120 by moving the fan blade 140 in the axial direction A.

When assembled, the fan blade pressure surfaces 152 and the disk post pressure surfaces 132 may retain the fan blade 140 radially within the fan disk 120. In particular, as the fan blade 140 is rotated during engine operation, the centrifugal force of the fan blade 140 may push the fan blade 140 outwards (e.g. in the radial direction R). Accordingly, the fan blade 140 will move radially outwards until the fan blade pressure surfaces 152 are flush against the disk post pressure surfaces 132. The fan blade pressure surfaces 152 and the disk post pressure surfaces 132 may then prevent further radial movement of the fan blade 140. As will be appreciated by those skilled in the art, as a result of the centrifugal force, the fan blade 140 will exert a force on the disk post 122, and the disk post 122 will exert an equal and opposite force on the fan blade 140. These forces will create stresses within the disk post 122 and the fan blade 140.

In light of FIG. 1 and as will be appreciated by those skilled in the art, the stresses within the disk post neck 130 will generally be higher than the stresses near the outer surface 126 because the disk post neck 130 is narrower and has less cross sectional area than the disk post 122 nearer to the outer surface 126. Accordingly, the disk post neck 130 may necessitate that the disk posts 122 be made from a material with sufficient material strength to withstand the stresses within the disk post neck 130 during engine operation. For example, the disk posts 122 and, more generally, the fan disk 120 may be made from a material such as steel, steel alloy, titanium, titanium alloy, Inconel, or other metal, metal alloy, or composite material.

As compared to the stresses within the disk post neck 130, the stresses within the disk post insert 160 may be measurably lower due to the increased cross sectional area through the disk post insert 160 and the disk posts 122 near the outer surface 126. In embodiments, the disk post insert 160 may, therefore, not require the same material strength as the disk post neck 130. Accordingly, the disk post insert 160 may be made from the same material as the disk post neck 130 or, alternatively, a different material that may have lower material strength and/or higher specific stiffness. Specific stiffness or specific modulus is a materials property consisting of the elastic modulus per mass density of a material. And the equation can be written as:

$$\text{specific modulus}=E/p \quad \text{(Eq. 1)}$$

where E is the elastic modulus and p is the density. In particular, the disk post insert 160 may be made from a material that has lower density than the material of the disk post neck 130. For example, in one non-limiting embodiment, the fan disk 120 may be made from Inconel, and the disk post insert 160 may be made from a lower density aluminum alloy. In other embodiments, the disk post insert 160 may be made from a material such as steel, steel alloy, titanium, titanium alloy, Inconel, shape memory alloy or other metal, metal alloy, or composite material. In some embodiment, the disk post insert 160 may be made from a material that is less expensive than the material of the fan disk 120.

When the fan disk 120 is made from a first material and the disk post insert 160 is made from a second material that is lower density than the first material, the overall weight of the engine may be lowered. Specifically, this may enable weight savings of the fan assembly 100 without sacrificing material strength at the disk post neck 130. Additionally or alternatively, this may enable the fan disk 120 to be made from a material of higher material strength without increasing the overall weight of the fan assembly 100. In some embodiments, this may allow the radius from axis A at which the fan blade 140 is retained (i.e. the distance in the radial direction R of the disk post pressure surfaces 132) to be decreased. By decreasing the radius at which the fan blade 140 is retained, the stress acting at the disk post neck 130 may increase due to the increased centrifugal force from the decreased radius. By decreasing the radius at which the fan blade 140 is retained, the overall efficiency of the engine may increase due to the increased fan blade area (e.g. above the disk post pressure surfaces 132). As an example, an overall benefit of radius ratio of at least 0.012 may be achieved using fan blade inserts formed of aluminum.

Figure 2:
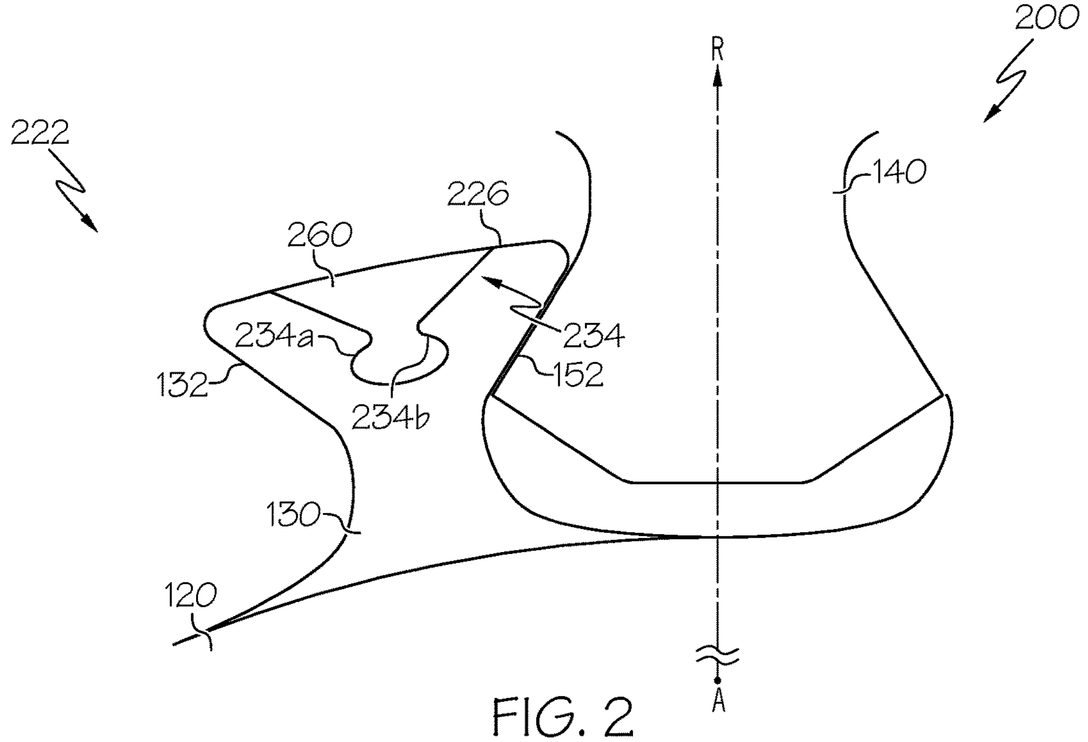
FIG. 2 schematically depicts a partial cross section of another fan assembly taken normal to the axial direction, according to one or more embodiments shown and described herein.

As described with reference to FIG. 1 herein, the insert receiving slot 134 and, correspondingly, the disk post insert 160 may have any angular, rounded, regular, or irregular shape. For example, referring now to FIG. 2, another embodiment of a fan assembly 200 is schematically depicted. As shown, the fan assembly 200 is substantially similar to the fan assembly 100. Accordingly, like numbers will be used to describe life features. For example, the fan assembly 200 may include a fan blade 140 which may be retained within a fan disk 120. The fan disk 120 may include disk posts 222, and each of the disk posts 222 may define an insert receiving slot 234. In particular, the insert receiving slot 234 may extend radially inward from an outer surface 226 such that it forms a concave hollow within the outer surface 226. In embodiments, the insert receiving slot 234 may define an irregular shape characterized by two retention surfaces 234*a* and 234*b*, such as depicted. The retention surfaces 234*a* and 234*b* may be oriented at an angle to the radial direction R. Accordingly, the two retention surfaces 234*a* and 243*b* may retain a disk post insert 260 within the insert receiving slot 234 when the disk post insert 260 is acted upon by a centrifugal force in the radial direction R. In some embodiments, the specific shape of the insert receiving slot 234 may be selected based, at least in part, on a known or modeled stress profile of the disk posts 222. Accordingly, in some such embodiments, the shape of the insert receiving slot 234 may be optimized and/or otherwise improved such that the disk post insert 260, which may be made from a lower density material than the disk posts 222 such as described, maximizes and/or otherwise improves weight reduction without sacrificing material strength at locations of high stress.

Figure 3:
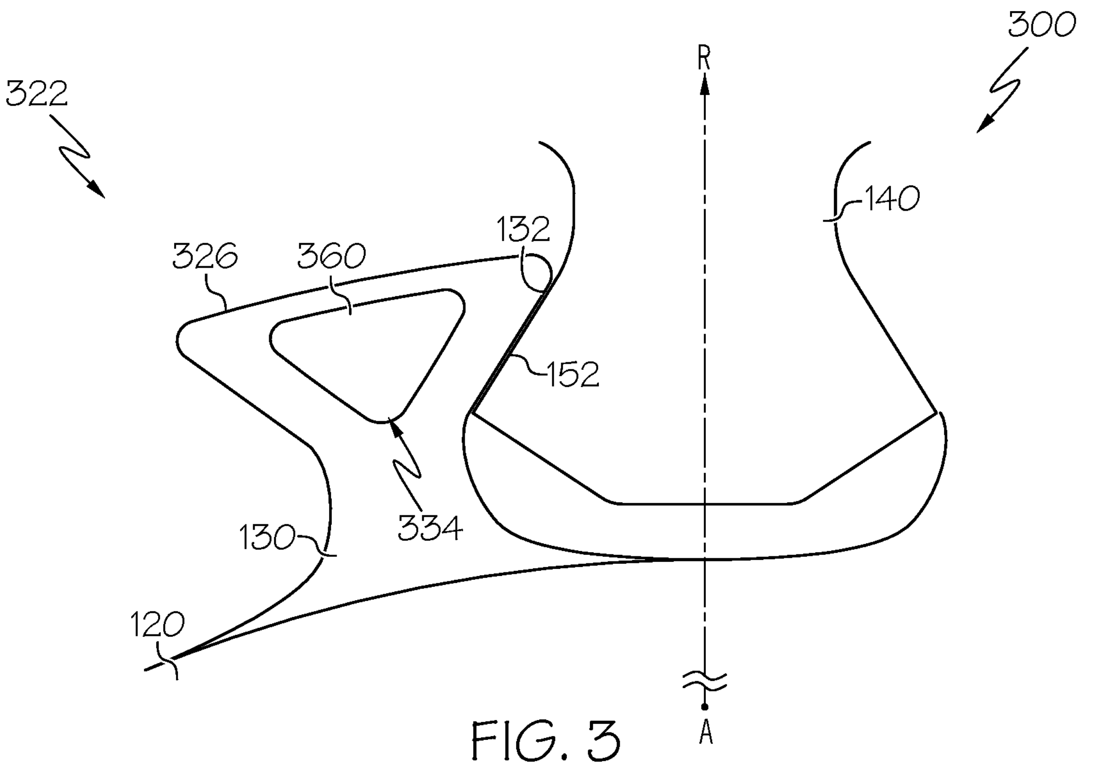
FIG. 3 schematically depicts a partial cross section of yet another fan assembly taken normal to the axial direction, according to one or more embodiments shown and described herein.
Figure 4:
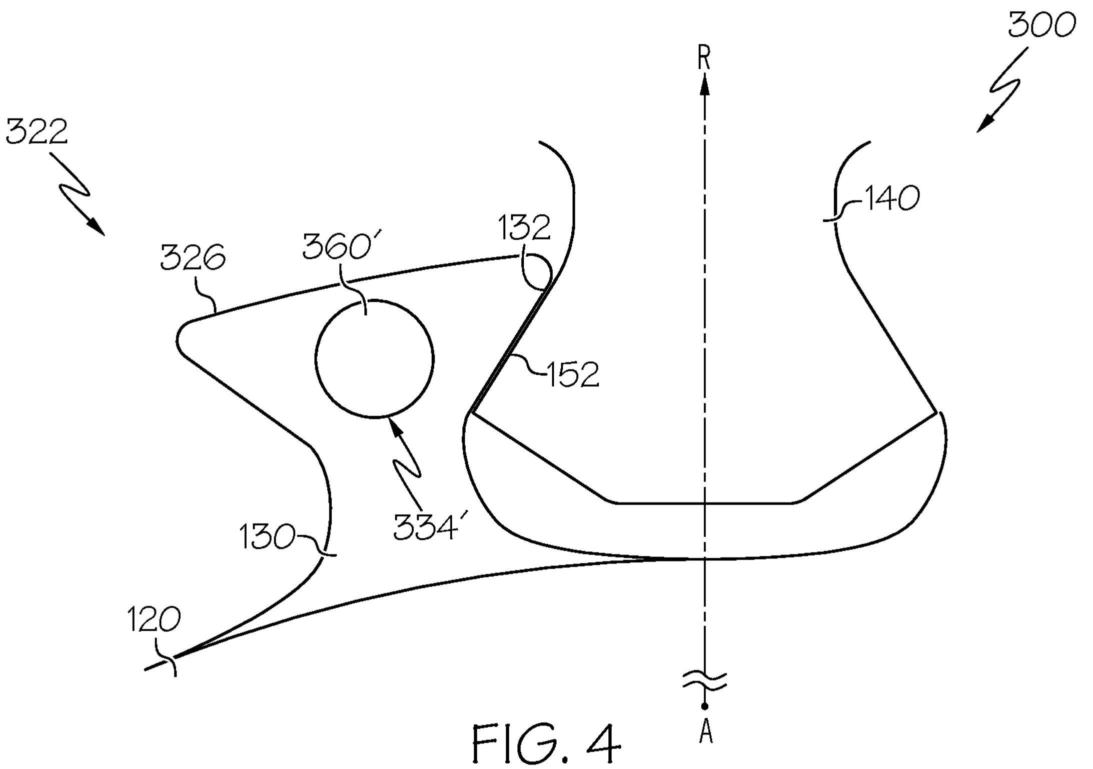
FIG. 4 schematically depicts a partial cross section of yet another fan assembly taken normal to the axial direction, according to one or more embodiments shown and described herein.

As another non-limiting example, referring now to FIG. 3, another embodiment of a fan assembly 300 is schematically depicted. As shown, the fan assembly 300 is substantially similar to the fan assemblies 100 and 200. Accordingly, like numbers will be used to describe like features. For example, the fan assembly 200 may include a fan blade 140 which may be retained within a fan disk 120. The fan disk 120 may include disk posts 322, and each of the disk posts 322 may define an insert receiving slot 334. In particular, in some embodiments, each of the disk posts 322 may fully encircle the insert receiving slot 334 such that an outer surface 326 of each of the disk posts 322 is uninterrupted. As depicted, the insert receiving slot 334 may have a substantially triangular shape (i.e., may be generally triangular, such as with the rounded corners illustrated in FIG. 3). However, other angular, rounded, regular, and irregular shapes are contemplated and possible. For example, referring now to FIG. 4, the insert receiving slot 334' and corresponding disk post insert 360' may be substantially round (i.e., may be generally round in shape, such as circular, oval or other suitable rounded shapes).

Figure 5:
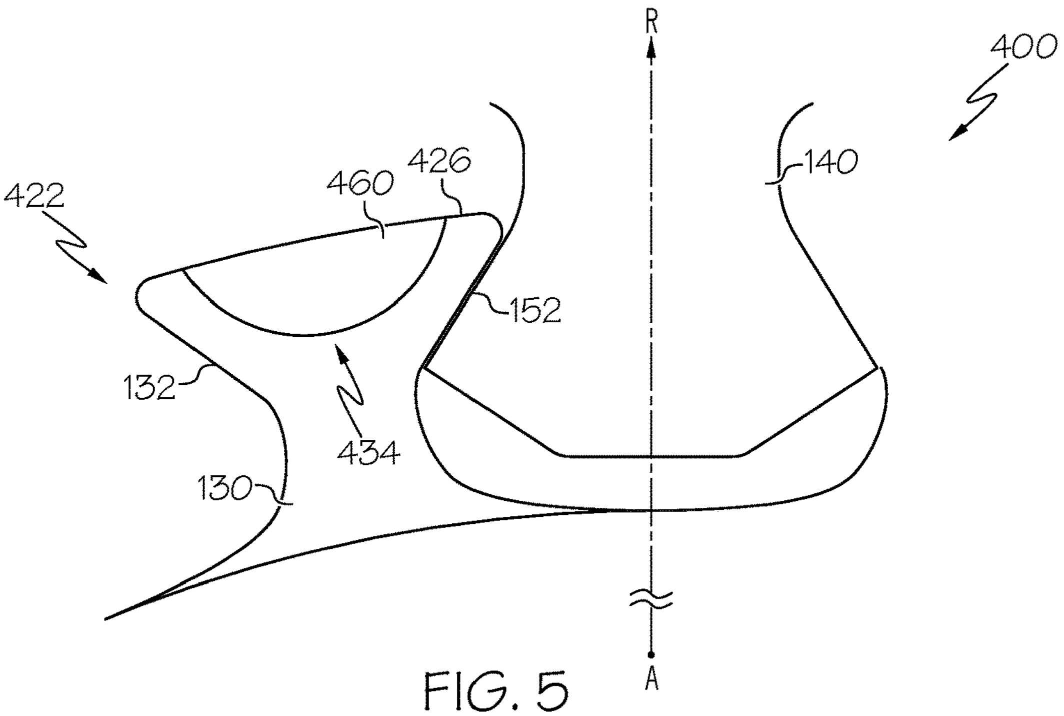
FIG. 5 schematically depicts a partial cross section of yet another fan assembly taken normal to the axial direction, according to one or more embodiments shown and described herein.

As yet another non-limiting example, referring now to FIG. 5, another embodiment of a fan assembly 400 is schematically depicted. As shown, the fan assembly 400 is substantially similar to the fan assemblies 100, 200, and 300. Accordingly, like numbers will be used to describe like features. For example, the fan assembly 400 may include a fan blade 140 which may be retained within a fan disk 120. The fan disk 120 may include disk posts 422, and each of the disk posts 422 may define an insert receiving slot 434. As shown, the insert receiving slot 434 may extend radially inward from an outer surface 426 such that the insert receiving slot 434 forms a concave hollow within the outer surface 426. However, unlike the previously described insert receiving slots 134 and 234, the insert receiving slot 434 may not define one or more retention surfaces oriented at an angle to the radial direction R such that the one or more retention surfaces retain the disk post insert 460 within the insert receiving slot 434 when the disk post insert 460 is acted upon by a centrifugal force in the radial direction R. Instead, in some embodiments, the disk post insert 460 may be retained in place by brazing, welding, adhesive, etc. In some embodiments, the disk post insert 460 may be shaped larger than the insert receiving slot 434 such that it is retained in place via an interference fit. It is noted that the fan assemblies 100, 200, and 300 may additionally or alternatively use brazing, welding, adhesive, interference fit, and the like for retention such as described.

Figure 6:
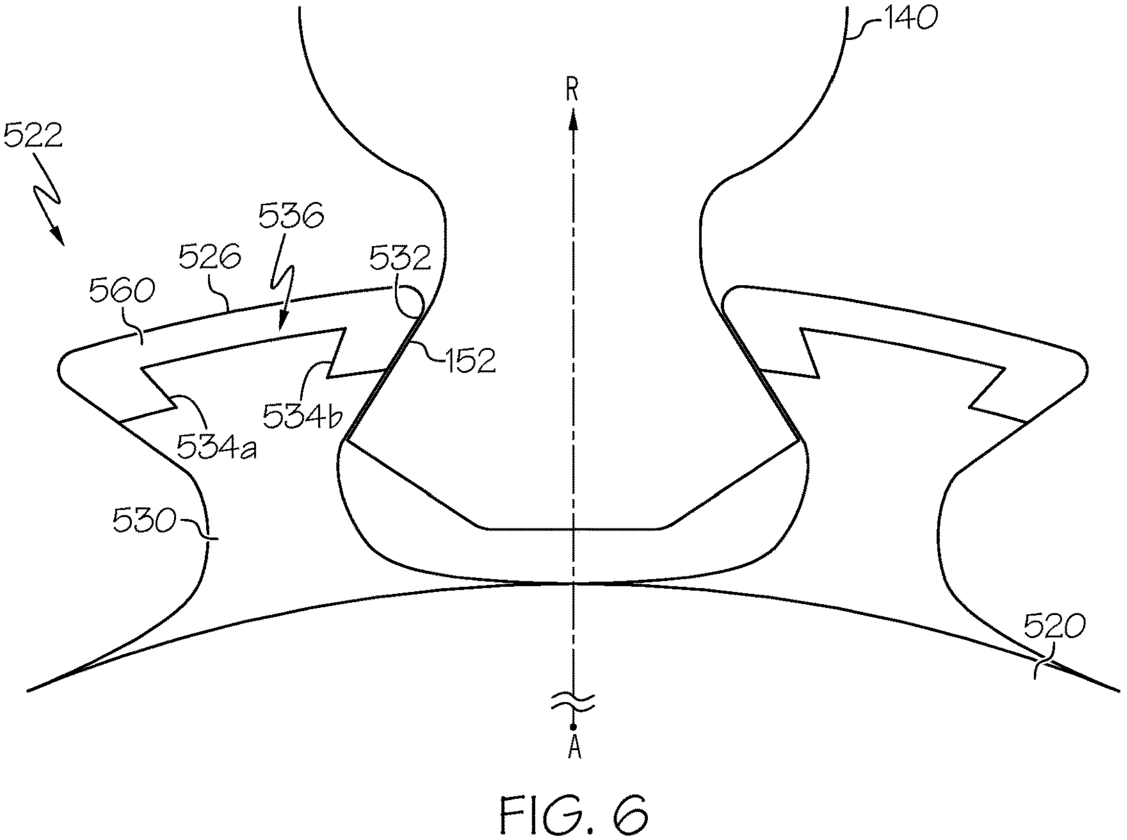
FIG. 6 schematically depicts a partial cross section of yet another fan assembly taken normal to the axial direction, according to one or more embodiments shown and described herein.

Referring now to FIG. 6, another embodiment of a fan assembly 500 is schematically depicted. As shown, the fan assembly 500 is similar to the fan assemblies 100, 200, 300, and 400 and like numbers will be used to describe like features. For example, the fan assembly 500 may include a fan blade 140, which may be retained within a fan disk 520. The fan disk 520 may include disk posts 522. The disk posts 522 may define two retention surfaces 534*a* and 534*b*, such as depicted. The retention surfaces 534*a* and 534*b* may be oriented at an angle to the radial direction R. Accordingly, the two retention surfaces 534*a* and 534*b* may retain a disk post insert 560 when the disk post insert 560 is acted upon by a centrifugal force in the radial direction R. As depicted, in some embodiments, the disk post insert 560 may be positioned and arranged about an outer perimeter of the disk posts 522 and retained within an insert receiving slot 536.

In this regard, the disk post insert 560 may provide at least a portion of disk post pressure surfaces 532 disposed at a non-parallel angle to the radial direction R. The disk post pressure surfaces 532 may be disposed between disk post neck 530 and outer surface 526. The disk post pressure surfaces 532 may be angled relative to the axial direction to retain fan blade 540 therein in a fashion similar to that described above.

Figure 7:
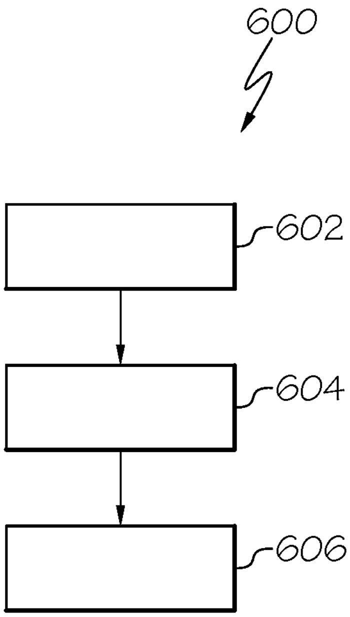
FIG. 7 depicts a method of assembling the fan assemblies including fan disk inserts, according to one or more embodiments shown and described herein.

Referring to FIG. 7, a method 600 of assembling the fan assemblies 100, 200, 300, 400 and 500 is illustrated. At step 602, a disk post insert 160, 260, 360, 460, 560 is inserted into an insert receiving slot 134, 234, 334, 434, 536 of a fan disk 120, 520. The fan disk 120, 520 includes a disk post 122, 222, 322, 422, 522 extending in a radial direction from the fan disk 120, 520. The disk post 122, 222, 322, 422, 522 includes the insert receiving slot 134, 234, 334, 434, 536 extending axially through the disk post 122, 222, 322, 422, 522 and disk post pressure surfaces 132 At step 604, a fan blade 140 is inserted into the fan disk 120, 520 such that the fan blade 140 is retained by the disk post pressure surfaces 132. At step 606, the disk post inserts 160, 260, 360, 460, 560 may be retained in place by brazing, welding, adhesive, etc.

In view of the above, it should now be understood that at least some embodiments of the present disclosure are directed to a fan assembly that includes a fan disk. The fan disk may include disk posts extending in a radial direction from the fan disk. Each of the disk posts may include an insert receiving slot extending axially through the disk post and a disk post pressure surface. The fan assembly may include disk post inserts assembled within the insert receiving slots of each of the disk posts. The disk post inserts may be filler means for filling the insert receiving slots and changing the overall composition of the disk posts compared to the disks posts being formed without the insert receiving slots. The fan assembly may include a fan blade retained by the disk post pressure surfaces of said each of the disk posts. Accordingly, the fan assembly may enable the disk posts and the disk posts inserts to be made from different materials. In some embodiments, this may allow the disk post inserts to be made from a material that is less dense and/or less expensive than the material of the disk post. Further, the overall structure of the disk posts with the disk post inserts added can retain an overall structural integrity that is suitable for use in the fan assemblies during operation.

Further aspects of the present disclosure are provided by the subject matter of the following clauses:

Clause 1: A rotor disk for a gas turbine engine comprising a disk body and disk posts extending in a radial direction from the disk body, each disk post comprising: an insert receiving slot extending axially at least partially through each disk post; and a disk post pressure surface; disk post inserts assembled within the insert receiving slots of each disk post; and a blade retained between disk post pressure surfaces of adjacent disk posts.

Clause 2: The rotor disk of any preceding clause, wherein each disk post further comprises: an outer surface; and a disk post neck disposed radially inward of the outer surface, wherein the disk post neck is narrower than the outer surface, wherein the insert receiving slot is disposed radially outward of the disk post neck.

Clause 3: The rotor disk of any preceding clause, wherein the insert receiving slot of each disk post has a cross sectional shape that narrows near the disk post neck.

Clause 4: The rotor disk of any of any preceding clause, wherein each disk post further comprises a radially outer surface, wherein the insert receiving slots of said each of the disk posts extend radially inward from the outer surface.

Clause 5: The rotor disk of any of any preceding clause, wherein each insert receiving slot of each disk post has an outer periphery and is closed about the outer periphery by said each disk post.

Clause 6: The rotor disk of any of any preceding clause, wherein the insert receiving slots of said each of the disk posts comprise one or more retention surfaces oriented at a non-parallel angle to the radial direction, the one or more retention surfaces configured to retain the disk post inserts in place during operation of the engine.

Clause 7: The rotor disk of any of any preceding clause, wherein the disk post inserts are brazed within the insert receiving slots of said each of the disk posts.

Clause 8: The rotor disk of any of any preceding clause, wherein the disk post inserts have a substantially round cross section.

Clause 9: The rotor disk of any of any preceding clause, wherein the disk post inserts have a substantially triangular cross section.

Clause 10: The rotor disk of any of any preceding clause, wherein the disk post inserts have a substantially polygonal cross section.

Clause 11: The rotor disk of any of any preceding clause, wherein the disk is made from a first material and the disk post inserts are made from a second material having higher specific stiffness than the first material.

Clause 12: A fan assembly comprising: a fan disk comprising a disk body and disk posts extending in a radial direction from the disk body, each disk post comprising a disk post pressure surface; and one or more retention surfaces oriented at a non-parallel angle to the radial direction; disk post inserts retained by the one or more retention surfaces of each disk post; and a fan blade retained by the disk post pressure surfaces of each disk post.

Clause 13: The fan assembly of any preceding clause, wherein said each disk post further comprises an insert receiving slot, wherein the disk post inserts assembled within the insert receiving slots of each disk post.

Clause 14: The fan assembly of any preceding clause, wherein said each disk post further comprises an outer surface, wherein the insert receiving slots of each disk post extend radially inward from the outer surface.

Clause 15: The fan assembly of any preceding clause, wherein each insert receiving slot of each disk post has an outer periphery and is closed about the outer periphery by said each disk post.

Clause 16: The fan assembly of any of any preceding clause wherein the disk post inserts have a substantially circular cross section.

Clause 17: The fan assembly of any of any preceding clause, wherein the insert receiving slot of each disk post has a cross sectional shape that narrows near the disk post neck.

Clause 18: A rotor disk for a gas turbine engine, the rotor disk comprising: rotational support means; blade retention means comprising insert receiving means; and filler means received by the insert receiving means.

Clause 19: The rotor disk of any of the preceding clauses, wherein the filler means comprises disk post inserts, the disk posts formed from a first material and the disk post inserts formed from a second material different from the first material having a higher specific stiffness than the first material.

Clause 20: The rotor disk of any of the preceding clauses, wherein each disk post further comprises an outer surface and a disk post neck disposed radially inward of the outer surface, wherein the disk post neck is narrower than the outer surface, wherein the insert receiving slot is disposed radially outward of the disk post neck.

Clause 21: A method of assembling a fan assembly comprising: inserting a disk post insert into an insert receiving slot of a fan disk, the fan disk comprising: a disk post extending in a radial direction from the fan disk, the disk post comprising: the insert receiving slot extending axially through the disk post; and disk post pressure surfaces; and inserting a fan blade into the fan disk such that it is retained by the disk post pressure surfaces.

Clause 22: The method of any preceding clause, wherein the fan disk is made from a first material and the disk post inserts are made from a second material having lower density than the first material.

Clause 23: The method of any preceding clause, wherein the fan disk is made from a first material and the disk post inserts are made from a second material having higher specific stiffness than the first material.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A rotor disk for a gas turbine engine, the rotor disk comprising:
- a disk body;
- disk posts extending in a radial direction from the disk body, each disk post comprising:
  - an insert receiving slot extending axially at least partially through each disk post; and
  - a disk post pressure surface;
- disk post inserts assembled within the insert receiving slots of each disk post; and
- a blade retained between disk post pressure surfaces of adjacent disk posts;
- wherein each disk post comprises an outer surface and a disk post neck disposed radially inward of the outer surface, the disk post neck is narrower than the outer surface;
- wherein the insert receiving slot of each disk post intersects the respective outer surface and is disposed radially outward of the respective disk post neck, the disk post insert of each disk post terminating at the outer surface and forming a part of the outer surface of the respective disk post.

2. The rotor disk of claim 1, wherein each disk post insert configured to fill a total volume of respective insert receiving slots.

3. The rotor disk of claim 2, wherein the disk post inserts do not extend radially outward beyond their respective insert receiving slots.

4. The rotor disk of claim 1, wherein the disk post inserts are entirely bound within their respective insert receiving slots.

5. The rotor disk of claim 1, wherein the insert receiving slots of said each of the disk posts comprise one or more retention surfaces oriented at a non-parallel angle to the radial direction, the one or more retention surfaces configured to retain the disk post inserts in place during operation of the engine.

6. The rotor disk of claim 1, wherein the disk post inserts are brazed within the insert receiving slots of said each of the disk posts.

7. The rotor disk of claim 1, wherein the disk post inserts have a substantially rounded cross section.

8. The rotor disk of claim 1, wherein the disk post inserts have a substantially triangular cross section.

9. The rotor disk of claim 1, wherein the disk post inserts have a substantially polygonal cross section.

10. The rotor disk of claim 1, wherein the disk posts are made from a first material and the disk post inserts are made from a second material having higher specific stiffness than the first material.

11. A fan assembly comprising:
- a fan disk comprising a disk body and disk posts extending in a radial direction from the disk body, each disk post comprising
  - a disk post pressure surface; and
  - an insert receiving slot having one or more retention surfaces oriented at a non-parallel angle to the radial direction;
- disk post inserts, each disk post insert retained by the one or more retention surfaces of the respective disk post; and
- a fan blade retained by the disk post pressure surfaces of adjacent disk posts;
- wherein each disk post comprises an outer surface and a disk post neck disposed radially inward of the outer surface, the disk post neck is narrower than the outer surface; and
- wherein the insert receiving slot of each disk post intersects the respective outer surface and is disposed radially outward of the respective disk post neck, the disk post insert of each disk post terminating at the outer surface and forming a part of the outer surface of the respective disk post.

12. The fan assembly of claim 11, wherein each disk post insert configured to fill a total volume of respective insert receiving slots.

13. The fan assembly of claim 12, wherein the disk post inserts do not extend radially outward beyond their respective insert receiving slots.

14. The fan assembly of claim 12, wherein the disk post inserts are entirely bound within their respective insert receiving slots.

15. The fan assembly of claim 12 wherein the disk post inserts have a substantially rounded cross section.

16. The fan assembly of claim 12, wherein the insert receiving slot of each disk post has a cross sectional shape that narrows near the disk post neck.

17. A rotor disk for a gas turbine engine, the rotor disk comprising:

a rotational support means comprising a disk body;

blade retention means comprising insert receiving means; and filler means received by the insert receiving means;

wherein the filler means comprises disk post inserts; and wherein the blade retention means comprises a plurality of disk posts, each disk post comprises an outer surface and an insert receiving slot that intersects the outer surface, each disk post slot having one of the disk post inserts inserted therein, the disk post inserts configured to terminate at the outer surface and form a part of the outer surface of the disk posts.

18. The rotor disk of claim 17, wherein the disk posts formed from a first material and the disk post inserts formed from a second material different from the first material having a higher specific stiffness than the first material.

19. The rotor disk of claim 17, each disk post comprises a disk post neck disposed radially inward of the outer surface, wherein the disk post neck is narrower than the outer surface, wherein the insert receiving slot is disposed radially outward of the disk post neck.

* * * * *